455-296 SR
FIP8106 XR 3,248,658
CROSS REFERENCE SEARCH ROOM
TX 5432E

April 26, 1966 C. J. BROWN 3,248,658

DETECTOR FOR INFORMATION SIGNALS HAVING AN EXTREMELY LOW SIGNAL-TO-NOISE RATIO

Filed March 14, 1963

INVENTOR.
CAROLL J. BROWN
BY John L Jackson
ATTORNEY

3248658
OR IN 328/165

United States Patent Office 3,248,658

Patented Apr. 26, 1966

3,248,658

DETECTOR FOR INFORMATION SIGNALS HAVING AN EXTREMELY LOW SIGNAL-TO-NOISE RATIO

Caroll J. Brown, San Jose, Calif., assignor to International Business Machines Corporation, New York, N.Y., a corporation of New York Filed Mar. 14, 1963, Ser. No. 265,159
3 Claims. (Cl. 328—165)

This invention relates to detectors in general and more particularly to an information detector for detecting information having a wandering baseline.

A common and accepted method of eliminating low amplitude noise from, for instance, a video signal, is to clip the bottom portion of the signal. Clipping and clamping a signal to provide more desirable or useful signal information works quite well where the baseline of the signal is predictable, i.e., does not wander. However, in many applications such as where a flying spot scanner is used to furnish an analog signal representative of the print content of a document being scanned, the baseline of the resultant signal is not stable, but is subject to low frequency wander. In a flying spot scanner, for example, where a spot is caused to move across an associated document and the reflected light optically directed onto a photodetector, it can be seen that numerous factors can cause the baseline of the resultant signal to wander. The print content and background of the document may vary; the spot intensity may vary as the spot moves across the screen; the output of the photo cell may vary as the spot moves relative to it; the transmission of the lens will vary as the spot moves relative to it, etc.

The wandering baseline is also a problem in many other applications as, for instance, where printed magnetic checks are read, where magnetic cards are read, and in high density magnetic recording where peak shifting is a problem.

From a consideration of a system which generates an information signal having a wandering baseline, it can be seen that conventional clipping techniques, while eliminating some of the low amplitude noise, would not eliminate all of the low amplitude noise and, additionally, often would destroy some of the desired information. Additionally, an information signal having a wandering baseline could not be passed through a double-ended clamp to provide a window, which is often necessary, since information not only would be lost, but additionally, noise would appear as information in the window.

It is, therefore, an object of the present invention to provide a novel detector for use in applications where an information signal having a wandering baseline is to be processed.

Another object of the present invention is to provide a method of and device for flattening out the baseline of any information signal.

Another object of the present invention is to provide a system for providing information signals at the output falling between two predetermined levels where the original information signal contains noise of D.C. level greater than some of the information signals due to a wandering baseline.

Other and further objects and advantages of the invention will be apparent from the following more particular description of the preferred embodiment of the invention, as illustrated in the accompanying drawings in which.

Briefly, an incoming signal including both spiked noise components and having a wandering baseline is superimposed on a sawtooth waveform having a slope such that the direction of the wandering baseline of the signal is always in a single direction. This signal is then passed through a capacitor-diode arrangement wherein two diodes, one of which is grounded, flatten out the baseline and eliminate the low frequency wander which results since the wandering baseline always forces the grounded diode into conduction. The signal is then fed through a clipper to eliminate the remaining noise component of the signal and thence through a double-ended clamp to recover small signals located on a pedestal.

Figure 1:
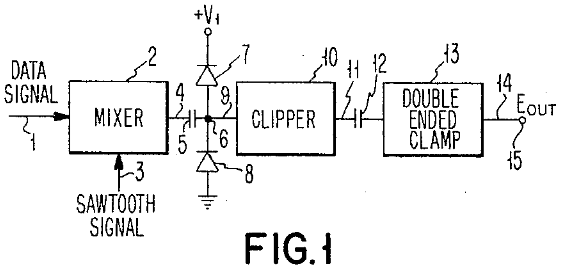
FIG. 1 is a block schematic diagram of the herein described system.

Refer first to FIG. 1. In FIG. 1 is shown a block schematic diagram of the herein described system wherein a data signal having a wandering baseline constitutes one input along line 1 to a mixer 2. As previously stated, the data signal may constitute the output of, for instance, a video scanner, the baseline of which is caused to wander because of variations in the components of the scanner system. In the hereinafter described operational description, a typical flying spot scanner output signal will constitute the data signal.

A sawtooth signal is also applied along line 3 to the mixer 2. As will hereinafter be described in more detail, the pulse width of the sawtooth waveforms is equal to one scan of the associated flying spot scanner. The output of the mixer 2 is fed along line 4 through capacitor 5 to junction 6. Junction 6 in turn is connected to the anode of diode 7, the cathode of which is connected to a positive potential $+V_1$. Junction 6 is also connected to both the cathode of diode 8, the anode of which is connected to ground, and along line 9 to the input of a clipper 10. The output of clipper 10 is connected along line 11 through capacitor 12 to the input of a double-ended clamp 13. The output of the double-ended clamp 13 is connected along line 14 to an output terminal 15.

Figure 4:
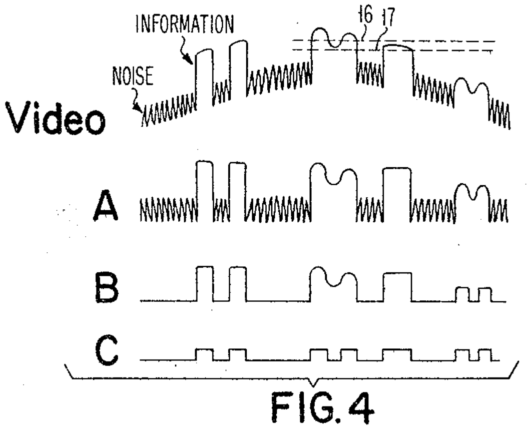
FIG. 4 shows waveforms appearing at various portions of the system of FIGS. 1 and 5.

For an operational description, consider first the waveform labeled "video" shown in FIG. 4 which is a typical output waveform from a flying spot scanner. From a consideration of this waveform, it can be seen that its baseline wanders with respect to a given voltage level such that if conventional clipping techniques were utilized to remove the low amplitude noise, certain of the information pulses would be destroyed. Likewise, it can also be seen that if the video signal shown were passed through a double-ended clamp to provide a window, some of the low amplitude noise might appear as information signals. Provision of a window is quite important in many applications. Consider the third information pulse occurring in the video signal. This pulse, having two peaks, could occur, for example, where the scanning spot of a flying spot scanner is larger than the mark that it is reading such that the associated photocell always sees some light which would prevent the output of the photocell from falling to the baseline. Thus, considering the third information pulse, in actuality it does not represent a single mark, but represents two closely spaced marks. The fact that this information pulse actually represents two separate marks would not be communicated to the associated system unless a window is taken of the pulse at voltage levels indicated by the lines 16 and 17. Thus, a window would show that two separate pulses were sensed. However, this window would not see some of the other information pulses.

Figure 3:
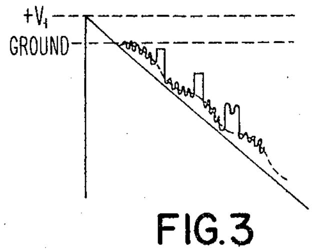
FIG. 3 is a waveform showing the output of the mixer of the herein described system.

In operation, the video or data signal is fed along line 1 to the mixer 2. A sawtooth waveform is applied along line 3 to the mixer 2. The sawtooth waveform may, for instance, be 100 volts in amplitude and in a flying spot scanner application its pulse width should equal one scan time. In the mixer 2, the data signal having the wandering baseline is superimposed on the sawtooth signal. In FIG. 3 is shown the output of the mixer 2 which is the video signal superimposed on the sawtooth waveform. From a close consideration of the waveform of FIG. 3, it can be seen that the direction of the wandering baseline of the video signal is always downward. The slope of the sawtooth is chosen such that this must always be true.

The output of the mixer 2, which, as previously stated, is the waveform shown in FIG. 3, is fed along line 4 to capacitor 5 and appears at junction 6. Diode 7, which has its cathode connected to the positive potential $+V_1$, clamps the waveform appearing at junction 6 so that it can never exceed $+V_1$. Diode 8, wihch has its anode connected to ground and its cathode connected to junction 6, conducts any time the signal received from the mixer 2 tries to go below ground such that junction 6 can never go negative. The wandering baseline thus always forces the ground clamp diode 8 into conduction. This flattens out the baseline. Diode 7, connected to the positive potential, is used to allow the capacitor 5 to be recharged by a rather large positive blanking pulse (or some type of reset pulse) occurring in the video at the end of each sweep time. The information pulses contained in the video signal are, however, unaffected since, though the junction 6 can never go below ground, capacitor 5 faithfully transmits any of the information pulses. Thus, the waveform shown at 4A appears at the input to the clipper 10. It should be noted that the waveform 4A, while having its baseline flattened out, still, however, contains low amplitude noise.

The waveform represented at 4A then passes through the clipper 10 which is a negative clipper which clips the low amplitude noise out of the signal to provide the signal shown at FIG. 4B. This signal then passes along line 11, through capacitor 12 and through the double-ended clamp 13 which detects the small pulses located on the pedestals. Thus, waveform 4C is provided at the output terminal 15 which is not only noise free, but, additionally, provides information relating to marks narrower than the spot width which would have otherwise been lost.

Figure 2:
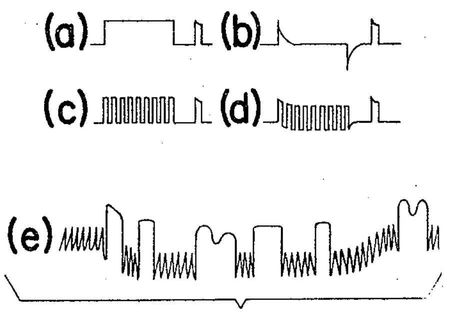
FIG. 2 shows a waveform illustrative of one prior art method of eliminating the wandering baseline from an information signal.

An obvious prior art method of flattening a baseline would be to pass the video signal through an RC combination having a time constant chosen to eliminate the low frequency wander. This method was actually considered by applicant, but was rejected for reasons as follows. Consider the action of an RC combination on the long rectangular pulse and narrow pulse of FIG. 2(*a*). They are differentiated as shown at FIG. 2(*b*). This same differentiation would take place if the pulse train of FIG. 2(*c*) were passed through an RC combination, as illustrated at FIG. 2(*d*). Thus, if the video waveform of FIG. 4 were passed through an RC combination to remove the low frequency wander, the waveform shown at FIG. 2(*e*) would result. Straight level clipping, therefore, would not provide all of the useful signal information.

Applicant's sawtooth scheme is really a method of performing capacity coupling to only one part of the waveform, i.e., the baseline. In other words, the low frequency component has been taken out of the lower part of the waveform, but not out of the entire waveform as in the case of the waveform shown in FIG. 2(*e*).

Figure 5:
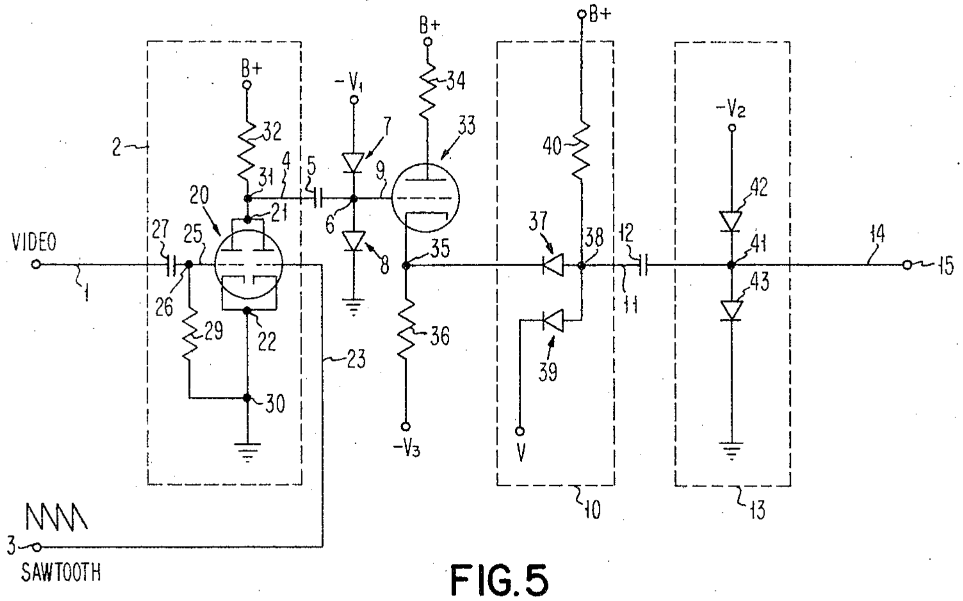
FIG. 5 is a schematic illustration of the system of FIG. 1.

In FIG. 5 is shown a more detailed schematic of the herein described system. In FIG. 5 a mixer tube 20 is provided having two plates connected to junction 21 and two cathodes connected to junction 22. One grid of the mixer tube 20 is connected along line 23 to the input terminal 3 while the other grid is connected along line 25 to junction 26, which in turn is connected through capacitor 27 to the other input terminal 1. Junction 26 is connected through resistor 29 to junction 30 which is grounded and is connected to junction 22.

Junction 21 is connected to junction 31 which is connected to one side of resistor 32, the other side of which is connected to the B+ potential. Junction 31 is also connected along line 4 through capacitor 5 to junction 6. Junction 6 in turn is connected to the cathode of diode 7, the anode of which is connected to a negative potential $-V_1$. Junction 6 is also connected to the anode of diode 8, the cathode of which is grounded. It will be noted that the polarity of the voltage $V_1$ and the diodes 7 and 8 have been reversed from that shown in FIG. 1 since the mixer shown in FIG. 5, the vacuum tube 20, inverts the incoming video and sawtooth signals.

Junction 6 is connected along line 9 to the grid of tube 33 which has its plate connected through resistor 34 to a B+ potential and its cathode connected to junction 35 which in turn is connected to one side of a resistor 36, the other side of which is connected to the potential $-V_3$. Junction 35 is also connected to the cathode of diode 37, the anode of which is connected to junction 38. Junction 38 in turn is connected to the anode of diode 39, the cathode of which is connected to the potential V which determines the amount of clipping. It can be seen from an examination of the schematic of FIG. 5 that the tube 33 is connected in cathode follower arrangement to constitute the input to the clipper 10 which comprises diodes 37 and 39 and resistor 40.

Junction 38 is connected along line 11 through capacitor 12 to the double-ended clamp 13. A capacitor 12 is connected to junction 41 which is connected to the cathode of diode 42, the anode of which is connected to a negative potential and is also connected to the anode of diode 43, the cathode of which is grounded. Junction 41 is also connected along line 14 to the output terminal 15.

The operation of the circuit of FIG. 5 is similar to that of FIG. 1. The signal to be shaped having a wandering baseline is fed along line 1 while a sawtooth signal is fed along line 3 to the opposite grid of tube 20. The output signal appearing at junction 31 corresponds to the signal shown in FIG. 3 inverted. This signal is then fed along line 4 through capacitor 5 to junction 6. As previously stated, the diodes 7 and 8 and the potential connected to diode 7 are reversed due to the inversion occurring in tube 20. Thus, diode 8 will conduct any time the inverted signal of FIG. 3 attempts to rise above ground. This signal is then fed through the cathode follower tube 33 to the clipper 10. The voltage applied to the cathode of diode 39 will determine the amount of clipping which will take place since the signal appearing at junction 38 cannot go more positive than the potential applied to the cathode of diode 39. The thus clipped signal is then fed through capacitor 12 to the double-ended clamp 13 which provides a window in that when the signal appearing at junction 41 attempts to go more negative than the voltage applied to the anode of diode 42, diode 42 will conduct whereas when the voltage or signal appearing at junction 41 attempts to go more positive than ground, diode 43 will conduct. Thus, if capacitor 12 is small enough, a peak detecting effect is obtained, as previously discussed.

In summary, an incoming signal including both noise components and having a wandering baseline is superimposed on a sawtooth waveform such that the slope of the low frequency wander component of the signal is always in a single direction. The resultant waveform is clamped to ground by diode 8 to flatten out the baseline and eliminate the low frequency wander. The signal is then fed through a conventional clipper 10 to eliminate the remaining noise component of the signal and thence through a double-ended clamp 13 to provide detection of small pulses on a pedestal.

In the above described manner, I have provided a novel detector for use in applications wherein information signals having a wandering baseline are to be processed which cannot be processed through use of conventional clipping techniques which, while eliminating some of the low amplitude noise, would not eliminate all of the low amplitude noise and, additionally, often would destroy some of the desired information. Additionally, I have provided a novel detector which will provide an output signal which can be passed through a double-ended clamp to provide detection of small pulses on a pedestal, which otherwise would have been lost.

While the invention has been particularly shown and described with reference to a preferred embodiment thereof, it will be understood by those skilled in the art that various changes in the form and details may be made therein without departing from the spirit and scope of the invention.

What is claimed is:

1. A circuit for stabilizing the voltage level of an incoming signal, said signal including a low frequency noise component of unpredictable frequency, said circuit comprising:

signal mixing means having a first and a second input terminal and an output terminal, means for applying said incoming signal to said first input terminal of said mixing means, means for generating a sawtooth signal, means for applying said sawtooth signal to said second terminal of said mixing means, whereby an output signal consisting of said incoming signal, including said low frequency noise component superimposed on said sawtooth signal appears at said output terminal of said mixing means, a capacitor having a first and a second terminal, said first terminal being connected to said output of said mixing means; and rectifying means connected to said second terminal of said capacitor for clamping said low frequency noise component of said output signal.

2. A circuit for detecting data pulses in an incoming signal, said signal including a low frequency component of unpredictable frequency, said circuit comprising;

signal mixing means having a first and a second input terminal and an output terminal, means for applying said incoming signal to said first input terminal of said mixing means, means for generating a sawtooth signal, means for applying said sawtooth signal to said second terminal of said mixing means, whereby an output signal consisting of said incoming signal including said low frequency noise component superimposed on said sawtooth signal appears at said output terminal of said mixing means, a capacitor having a first and a second terminal, said first terminal being connected to said output of said mixing means, rectifying means connected to said second terminal of said capacitor for clamping said low frequency component of said output signal, and means, including a clipping circuit, for detecting the data pulses carried in said output signal.

3. A circuit for detecting data pulses in an incoming signal, said signal including a low frequency component of unpredictable frequency, said circuit comprising:

signal mixing means having a first and a second input terminal and an output terminal, means for applying said incoming signal to said first input terminal of said mixing means, means for generating a sawtooth signal, means for applying said sawtooth signal to said second terminal of said mixing means, whereby an output signal consisting of said incoming signal, including said low frequency noise component superimposed on said sawtooth signal appears at said output terminal of said mixing means, a capacitor having a first and a second terminal, said first terminal being connected to said output of said mixing means, rectifying means connected to said second terminal of said capacitor for clamping said low frequency noise component of said output signal, and means, including a clipping circuit and a double-ended clamp, for detecting the data pulses carried in said output signal.

References Cited by the Examiner

UNITED STATES PATENTS

| | | | |
|---|---|---|---|
| 2,506,770 | 5/1950 | Braden | 328—54 |
| 2,843,662 | 7/1958 | Rieke | 328—173 |
| 2,900,501 | 8/1959 | Momberg | 328—168 |
| 2,944,217 | 6/1960 | Greanias | 328—169 |
| 2,985,839 | 5/1961 | Brown | 328—169 |
| 3,080,532 | 3/1963 | Cunningham | 328—165 |
| 3,130,371 | 4/1964 | Copeland | 307—88.5 |

FOREIGN PATENTS

| | | |
|---|---|---|
| 521,247 | 3/1955 | Italy. |
| 559,620 | 10/1955 | Italy. |

JOHN W. HUCKERT, *Primary Examiner.*

J. D. CRAIG, *Assistant Examiner.*